(12) United States Patent
Wang

(10) Patent No.: US 11,943,657 B2
(45) Date of Patent: Mar. 26, 2024

(54) PDCP DUPLICATION FUNCTION ACTIVATION METHOD AND DEVICE, TERMINAL AND BASE STATION

(71) Applicant: SPREADTRUM COMMUNICATIONS (SHANGHAI) CO., LTD., Shanghai (CN)

(72) Inventor: Tingting Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 407 days.

(21) Appl. No.: 17/289,529

(22) PCT Filed: Oct. 14, 2019

(86) PCT No.: PCT/CN2019/110945
§ 371 (c)(1),
(2) Date: Apr. 28, 2021

(87) PCT Pub. No.: WO2020/088228
PCT Pub. Date: May 7, 2020

(65) Prior Publication Data
US 2021/0400529 A1 Dec. 23, 2021

(30) Foreign Application Priority Data
Oct. 29, 2018 (CN) .......................... 201811268713.0

(51) Int. Cl.
*H04W 28/06* (2009.01)
*H04W 76/15* (2018.01)
*H04W 76/20* (2018.01)

(52) U.S. Cl.
CPC ........... *H04W 28/06* (2013.01); *H04W 76/15* (2018.02); *H04W 76/20* (2018.02)

(58) Field of Classification Search
CPC . H04L 5/0053; H04L 1/08; H04L 1/22; H04L 1/1835; H04L 1/0009;
(Continued)

(56) References Cited

U.S. PATENT DOCUMENTS

2017/0374579 A1* 12/2017 Wang ................ H04W 28/0278
2018/0279262 A1*  9/2018 Babaei .................. H04L 1/1848
(Continued)

FOREIGN PATENT DOCUMENTS

| CN | 108370304 A | 8/2018 |
|----|-------------|--------|
| CN | 108401505 A | 8/2018 |

(Continued)

OTHER PUBLICATIONS

Ericsson, "Packet Duplication in CA", 3GPP TSG-RAN WG2 #99, Berlin, Germany, Aug. 21-25, 2017, Tdoc R2-1708333 updated from R2-1707172; 3 pages.
(Continued)

*Primary Examiner* — Jung Liu
(74) *Attorney, Agent, or Firm* — CANTOR COLBURN LLP

(57) ABSTRACT

A PDCP replication function activation method and device, and a terminal and a base station. The activation method comprises: receiving PDCP replication function activation signaling sent by a network, the PDCP replication function activation signaling comprising a data offloading instruction identifier of a radio bearer, the radio bearer being configured with a PDCP duplication function; and determining the number of duplications of a data packet of the radio bearer on the basis of the PDCP replication function activation signaling. By means of the technical solutions provided by the present invention, a multi-connectivity PDCP duplication function can be effectively and flexibly activated.

19 Claims, 4 Drawing Sheets a PDCP duplication function activation signaling is received from a network, wherein the PDCP duplication function activation signaling includes at least one data offload indication identifier of at least one radio bearer, and the at least one radio bearer is configured with a PDCP duplication function — S101 a duplication number of a data packet of the at least one radio bearer is determined based on the PDCP duplication function activation signaling — S102

(58) Field of Classification Search
CPC ... H04L 2001/0096; H04L 1/04; H04L 5/001; H04L 47/32; H04L 1/16; H04L 5/0055; H04W 76/15; H04W 36/0055; H04W 28/065; H04W 76/27; H04W 76/20; H04W 28/0278; H04W 76/12; H04W 36/0072; H04W 72/02; H04W 72/21

See application file for complete search history.

(56) References Cited

U.S. PATENT DOCUMENTS

| | | | | |
|---|---|---|---|---|
| 2018/0324642 | A1* | 11/2018 | Yu | H04L 5/0053 |
| 2020/0145171 | A1* | 5/2020 | Jiang | H04L 5/0098 |
| 2020/0178327 | A1* | 6/2020 | Jiang | H04W 76/19 |
| 2020/0314805 | A1* | 10/2020 | Tseng | H04W 76/12 |

FOREIGN PATENT DOCUMENTS

| | | |
|---|---|---|
| CN | 108401530 A | 8/2018 |
| WO | 2018143600 A1 | 8/2018 |
| WO | 2018156074 A1 | 8/2018 |
| WO | 2018172136 A1 | 9/2018 |

OTHER PUBLICATIONS

Huawei, et al. "Discussion on PDCP Duplication in L2 Parameters", 3GPP TSG-RAN WG2 Meeting 102; Busan, Korea, May 21-25, 2018; R2-1808423; 8 pages.

International Search Report for International Application No. PCT/CN2019/110945; dated Dec. 30, 2019.

ZTE, "Initial Consideration on URLLC Duplication Enhancement", 3GPP TSG-RAN WG3 #101bis; Chengdu, China, Oct. 8-12, 2018; R3-185577; 4 pages.

EPO Extended European Search Report for corresponding EP Application No. 19878588.3; dated Nov. 11, 2021.

Intel Corporation, "Packet Duplication for URLLC in DA and CA Deployment"; 3GPP TSG-RAN WG2 NR Ad-hoc; R2-1700336; Jan. 17-19, 2017; 3 pages.

* cited by examiner

PDCP DUPLICATION FUNCTION ACTIVATION METHOD AND DEVICE, TERMINAL AND BASE STATION

CROSS-REFERENCE TO RELATED APPLICATIONS

This is the U.S. national stage of application No. PCT/CN2019/110945, filed on Oct. 14, 2019 Priority under 35 U.S.C. § 119(a) and 35 U.S.C. § 365(b) is claimed from Chinese Application No. 201811268713.0, filed Oct. 29, 2018, the disclosure of which is also incorporated herein by reference.

TECHNICAL FIELD

The present disclosure generally relates to radio communication technology field, and more particularly, to a Packet Data Convergence Protocol (PDCP) duplication function activation method and device, a terminal and a base station.

BACKGROUND

The Fifth-Generation mobile communications (5G) New Radio (NR) introduced PDCP duplication.

In existing techniques, PDCP duplication has two application scenarios, Carrier Aggregation (CA) and Dual Connectivity (DC). Regardless of CA duplication or DC duplication, a main purpose is to improve reliability of Ultra Reliable Low Latency Communications (URLLC) service transmission and reduce transmission delay. For PDCP duplication, a PDCP Protocol Data Unit (PDU) is duplicated to the same two duplication at a PDCP layer of a transmitter, and the two duplication is issued to two different Radio Link Control (RLC) entities respectively and then transmitted through different cells. If a PDCP layer of a receiver successfully receives the same two PDCP PDUs, it deletes one PDCP PDU and retains one PDCP PDU. That is, a same data packet is duplicated to the same two which are transmitted through two different legs (also called branches), thereby improving reliability of data transmission.

At the 81$^{st}$ meeting (RAN1 #81) of Radio Access Network working group 1 (RAN1), research objectives of a topic NR Industrial Internet of Things were refined and modified. The research objectives include enhancement to data duplication and multi-connectivity technologies. When data is transmitted through at most two network nodes, it is allowed to combine CA duplication and DC duplication, so that a piece of data can pass through more than two legs for more than two duplication transmission.

Currently, an activation/deactivation mechanism of a PDCP duplication function in both CA and DC scenarios is aimed at two-legs duplication. Each Data Radio Bearer (DRB) configured with the PDCP duplication function can indicate whether the PDCP duplication function of the DRB is in an active state or an inactive state through 1 bit. When in the active state, PDCP performs a duplication operation and uses two legs for data transmission; when in the deactivated state, the PDCP does not perform a duplication operation and performs data transmission merely through a primary leg.

However, for multi-connectivity duplication, a Radio Bearer (RB) configured with a PDCP duplication function may be configured with more than two legs. In this case, for each RB, 1-bit indication information in the existing activation/deactivation mechanism is not enough to indicate which legs the RB uses for data transmission.

SUMMARY

Embodiments of the present disclosure may activate a multi-connectivity PDCP duplication function flexibly and effectively.

In an embodiment of the present disclosure, a PDCP duplication function activation method is provided, including: receiving a PDCP duplication function activation signaling from a network, wherein the PDCP duplication function activation signaling includes at least one data offload indication identifier of at least one radio bearer, and the at least one radio bearer is configured with a PDCP duplication function; and determining a duplication number of a data packet of the at least one radio bearer based on the PDCP duplication function activation signaling.

Optionally, the PDCP duplication function activation signaling further includes indication information, wherein the indication information is used to indicate at least one logical channel used by the at least one radio bearer which is selected from logical channels configured by the at least one radio bearer.

Optionally, when the at least one radio bearer includes a plurality of radio bearers, the PDCP duplication function activation signaling includes a plurality of data offload indication identifiers and a plurality of pieces of indication information, wherein the plurality of data offload indication identifiers and the plurality of pieces of indication information correspond to the plurality of radio bearers respectively, and are arranged in an ascending or descending order of radio bearer identifiers of the plurality of radio bearers.

Optionally, before receiving the PDCP duplication function activation signaling from the network, the method further includes: receiving first activation configuration information from the network, wherein the first activation configuration information includes: a PDCP duplication field for indicating to configure the PDCP duplication function, a logical channel configured by each PDCP entity, and a carrier used by each logical channel.

Optionally, receiving the first activation configuration information from the network includes: receiving the first activation configuration information from the network via a Radio Resource Control (RRC) signaling.

Optionally, the indication information uses a bitmap to indicate a usage status of the at least one logical channel configured by the at least one radio bearer.

Optionally, the PDCP duplication function is a PDCP duplication function combined with DC and CA, and in the indication information, indication identifiers of logical channels are recorded in two groups, wherein the indication identifiers of the logical channels in each group are arranged in an ascending or descending order of Logical Channel IDentifier (LCID), one group of logical channels belongs to a master node, and the other group of logical channels belongs to a secondary node.

Optionally, before receiving the PDCP duplication function activation signaling from the network, the method further includes: receiving second activation configuration information from the network, wherein the second activation configuration information includes: a PDCP duplication field for indicating to configure the PDCP duplication function, a logical channel configured by each PDCP entity, priorities of logical channels, and a carrier used by each logical channel.

Optionally, receiving the second activation configuration information from the network includes: receiving the second activation configuration information from the network via an RRC signaling.

Optionally, the indication information includes a number of logical channels used by the at least one radio bearer, and the method further includes: determining the logical channels used by the at least one radio bearer based on the number of the logical channels and the priorities of the logical channels.

Optionally, the PDCP duplication function is a PDCP duplication function combined with DC and CA, and in the indication information, a number of logical channels used by the at least one radio bearer which belong to a master node and a number of logical channels used by the at least one radio bearer which belong to a secondary node are separately recorded.

Optionally, the PDCP duplication function is a PDCP duplication function combined with DC and CA, and in the second activation configuration information, priorities of logical channels belonging to a master node and priorities of logical channels belonging to a secondary node are separately ordered, or, priorities of logical channels belonging to a master node and priorities of logical channels belonging to a secondary node are uniformly ordered.

Optionally, determining a duplication number of a data packet of the at least one radio bearer based on the PDCP duplication function activation signaling includes: when the at least one data offload indication identifier indicates that the at least one radio bearer is allowed to perform data offload, determining whether a data amount of the data packet is greater than or equal to a preset offload threshold; if the data amount of the data packet is greater than or equal to the preset offload threshold, dividing the data packet into a first data packet and a second data packet, and determining a number of first logical channels used by the at least one radio bearer and a number of second logical channels used by the at least one radio bearer based on the indication information, to obtain a duplication number of the first data packet and a duplication number of the second data packet; and if the data amount of the data packet is less than the preset offload threshold, determining a number of third logical channels used by the at least one radio bearer based on the indication information, to obtain the duplication number of the data packet, wherein the first data packet refers to a data packet transmitted through a master node, the second data packet refers to a data packet transmitted through a secondary node, the first logical channels belong to the master node, the second logical channels belong to the secondary node, and the third logical channels belong to the master node.

Optionally, after determining the number of first logical channels used by the at least one radio bearer and the number of second logical channels used by the at least one radio bearer based on the indication information, to obtain the duplication number of the first data packet and the duplication number of the second data packet, the method further includes: duplicating the first data packet and the second data packet based on the duplication number of the first data packet and the duplication number of the second data packet, transmitting data packets obtained by duplicating the first data packet to the first logical channels, and transmitting data packets obtained by duplicating the second data packet to the second logical channels.

Optionally, after determining the number of third logical channels used by the at least one radio bearer based on the indication information, to obtain the duplication number of the data packet, the method further includes: duplicating the data packet based on the duplication number of the data packet, and transmitting data packets obtained by duplicating the data packet to the third logical channels.

Optionally, determining a duplication number of a data packet of the at least one radio bearer based on the PDCP duplication function activation signaling includes: when the at least one data offload indication identifier indicates that the at least one radio bearer does not perform data offload, determining the number of logical channels used by the at least one radio bearer based on the indication information to obtain the duplication number of the data packet.

Optionally, after determining the number of logical channels used by the at least one radio bearer based on the indication information to obtain the duplication number of the data packet, the method further includes: duplicating the data packet based on the duplication number of the data packet, and transmitting data packets obtained by duplicating the data packet to the logical channels.

Optionally, the at least one data offload indication identifier is disposed before or after the indication information of the at least one radio bearer.

In an embodiment of the present disclosure, a PDCP duplication function activation method is provided, including: determining a PDCP duplication function activation signaling, wherein the PDCP duplication function activation signaling includes at least one data offload indication identifier of at least one radio bearer configured with a PDCP duplication function; and transmitting the PDCP duplication function activation signaling to a User Equipment (UE), so that the UE determines a duplication number of a data packet of the at least one radio bearer based on the PDCP duplication function activation signaling.

Optionally, the PDCP duplication function activation signaling further includes indication information, wherein the indication information is used to indicate at least one logical channel used by the at least one radio bearer which is selected from logical channels configured by the at least one radio bearer.

Optionally, when the at least one radio bearer includes a plurality of radio bearers, the PDCP duplication function activation signaling includes a plurality of data offload indication identifiers and a plurality of pieces of indication information, wherein the plurality of data offload indication identifiers and the plurality of pieces of indication information correspond to the plurality of radio bearers respectively, and are arranged in an ascending or descending order of radio bearer identifiers of the plurality of radio bearers.

Optionally, before determining the PDCP duplication function activation signaling, the method further includes: transmitting first activation configuration information to the UE, wherein the first activation configuration information includes: a PDCP duplication field for indicating to configure the PDCP duplication function, a logical channel configured by each PDCP entity, and a carrier used by each logical channel.

Optionally, transmitting the first activation configuration information to the UE includes: transmitting the first activation configuration information to the UE via an RRC signaling.

Optionally, the indication information uses a bitmap to indicate a usage status of the at least one logical channel configured by the at least one radio bearer.

Optionally, the PDCP duplication function is a PDCP duplication function combined with DC and CA, and in the indication information, indication identifiers of logical channels are recorded in two groups, wherein the indication identifiers of the logical channels in each group are arranged in an ascending or descending order of LCID, one group of logical channels belongs to a master node, and the other group of logical channels belongs to a secondary node.

Optionally, before determining the PDCP duplication function activation signaling, the method further includes: transmitting second activation configuration information to the UE, wherein the second activation configuration information includes: a PDCP duplication field for indicating to configure the PDCP duplication function, a logical channel configured by each PDCP entity, priorities of logical channels, and a carrier used by each logical channel.

Optionally, transmitting the second activation configuration information to the UE includes: transmitting the second activation configuration information to the UE via an RRC signaling.

Optionally, the indication information includes a number of logical channels used by the at least one radio bearer, so that the UE determines the logical channels used by the at least one radio bearer based on the number of the logical channels and the priorities of the logical channels.

Optionally, the PDCP duplication function is a PDCP duplication function combined with DC and CA, and in the indication information, a number of logical channels used by the at least one radio bearer which belong to a master node and a number of logical channels used by the at least one radio bearer which belong to a secondary node are separately recorded.

Optionally, the PDCP duplication function is a PDCP duplication function combined with DC and CA, and in the second activation configuration information, priorities of logical channels belonging to a master node and priorities of logical channels belonging to a secondary node are separately ordered, or, priorities of logical channels belonging to a master node and priorities of logical channels belonging to a secondary node are uniformly ordered.

Optionally, the at least one data offload indication identifier is disposed before or after the indication information of the at least one radio bearer.

In an embodiment of the present disclosure, a PDCP duplication function activation device is provided, including: a first receiving circuitry configured to receive a PDCP duplication function activation signaling from a network, wherein the PDCP duplication function activation signaling includes at least one data offload indication identifier of at least one radio bearer, and the at least one radio bearer is configured with a PDCP duplication function; and a first determining circuitry configured to determine a duplication number of a data packet of the at least one radio bearer based on the PDCP duplication function activation signaling.

In an embodiment of the present disclosure, a PDCP duplication function activation device is provided, including: a determining circuitry configured to determine a PDCP duplication function activation signaling, wherein the PDCP duplication function activation signaling includes at least one data offload indication identifier of at least one radio bearer configured with a PDCP duplication function; and a first transmitting circuitry configured to transmit the PDCP duplication function activation signaling to a UE, so that the UE determines a duplication number of a data packet of the at least one radio bearer based on the PDCP duplication function activation signaling.

In an embodiment of the present disclosure, a storage medium having computer instructions stored therein is provided, wherein when the computer instructions are executed, any one of the above methods is performed.

In an embodiment of the present disclosure, a terminal including a memory and a processor is provided, wherein the memory has computer instructions stored therein, and when the processor executes the computer instructions, any one of the above methods is performed.

In an embodiment of the present disclosure, a base station including a memory and a processor is provided, wherein the memory has computer instructions stored therein, and when the processor executes the computer instructions, any one of the above methods is performed.

Embodiments of the present disclosure may provide following advantages.

In embodiments of the present disclosure, a PDCP duplication function activation method is provided, including: receiving a PDCP duplication function activation signaling from a network, wherein the PDCP duplication function activation signaling includes at least one data offload indication identifier of at least one radio bearer, and the at least one radio bearer is configured with a PDCP duplication function; and determining a duplication number of a data packet of the at least one radio bearer based on the PDCP duplication function activation signaling. With the embodiments of the present disclosure, the data offload indication identifier for multi-connectivity duplication (for example, PDCP duplication combined with DC and CA) may be determined based on the activation signaling configured with the PDCP duplication function, whether to perform data offload during multi-connectivity duplication may be determined based on the data offload indication identifier, and the duplication number of the data packet may be determined accordingly, which may effectively and flexibly activate or deactivate the PDCP duplication function, so that the network may select a leg with better transmission quality based on radio leg transmission quality and other associated factors, thereby improving transmission resource utilization.

Further, the PDCP duplication function activation signaling further includes indication information, wherein the indication information is used to indicate at least one logical channel used by the at least one radio bearer which is selected from logical channels configured by the at least one radio bearer. With the indication information, when more than two logical channels are configured for the UE, the PDCP duplication function may be activated for the UE, and the logical channel used by the radio bearer of the UE may also be indicated, which further helps to flexibly activate the PDCP duplication function of the UE.

DETAILED DESCRIPTION

Figure 1:
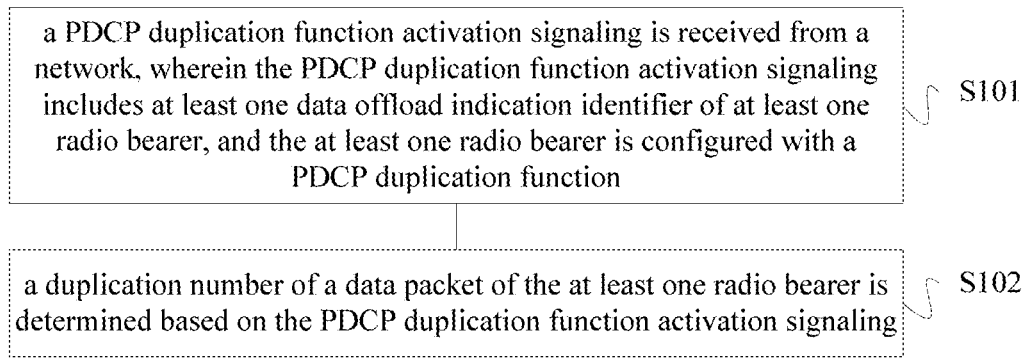
FIG. 1 is a flow chart of a PDCP duplication function activation method according to an embodiment.

Those skilled in the art could understand that, as described in the background, exiting techniques cannot activate or deactivate a PDCP duplication function flexibly and effectively.

In existing techniques, PDCP duplication includes CA duplication and DC duplication.

In a CA scenario, the CA duplication function configures a PDCP duplication function for each RB through an RRC signaling. When a UE uses PDCP duplication, an additional duplication RLC entity can be established for the RB. The RRC message may also indicate a cell group identifier and an LCID of a primary RLC entity. The RRC message may also set a duplication initial state (for example, an active state or an inactive state) for the RB. The PDCP duplication in the CA scenario corresponds to a Medium Access Control (MAC) entity. In addition, the RRC message may be configured with two Logical CHannels (LCHs) (also referred to as two RLC entities) to be mapped to different carriers respectively.

The PDCP duplication function needs to be activated after it is configured through the RRC signaling before usage. The activation and deactivation of the PDCP duplication function is achieved by activating/deactivating a MAC Control Element (CE) of a base station (for example, gNB). The MAC CE includes bitmap information, and each bit in the bitmap information corresponds to a DRB configured with a PDCP duplication function. When the bit corresponding to the DRB is 1, it means that the DRB is activated, and when the bit corresponding to the DRB is 0, it means that the DRB is deactivated.

After the DRB is activated, a PDCP layer may perform duplication on the data packet, and transmit the same two duplicated PDCP PDUs to the two RLC entities corresponding to the DRB respectively. The two RLC entities may transmit the duplicated PDCP PDUs respectively.

After the PDCP duplication function of the DRB is deactivated, the correspondence between the LCH and the carrier corresponding to the DRB no longer exists. The PDCP layer of the UE no longer performs duplication on the data packet, and the primary RLC entity (i.e., the primary LCH) transmits the data packet. The PDCP entity of the UE may notify the secondary RLC entity to delete data packet buffer in the secondary LCH.

In a DC scenario, a PDCP duplication function uses split bearer as a baseline for duplication. Similar to the CA scenario, the PDCP duplication function can be used merely after an RRC signaling is configured and activated. The activation/deactivation of the PDCP duplication function is realized by a base station (for example, gNB) activating/deactivating a MAC CE. The MAC CE still includes bitmap information, and each bit in the bitmap information corresponds to a DRB configured with a PDCP duplication function. The mapping between the DRB and the bitmap is based on DRB ID configured with a duplication function. When the bit corresponding to the DRB is 1, it means that the PDCP duplication function of the DRB is activated, and when the bit corresponding to the DRB is 0, it means that the PDCP duplication function of the DRB is deactivated.

After the DRB is activated, the PDCP entity may perform duplication on the data packet, and transmit the same two duplicated PDCP PDUs to the two RLC entities corresponding to the DRB respectively. The two RLC entities may transmit the duplicated PDCP PDUs respectively.

After the DRB is deactivated, the UE reuses a split operation, and uses associated parameters of an initial split operation to perform the split operation.

In the CA scenario, the PDCP duplication function configures the PDCP duplication function for each RB through an signaling. When the UE uses PDCP duplication, an additional duplication RLC entity may be established for the RB. The RRC signaling may also indicate a cell group identifier and an LCID of a primary RLC entity. The RRC signaling may also set a duplication initial state (for example, an active state or an inactive state) for the RB. The PDCP duplication in the CA scenario corresponds to a MAC entity. The RRC message may also be configured with two LCHs (i.e., two RLC entities) to be mapped to different carriers respectively.

The PDCP duplication function needs to be activated after it is configured through RRC signaling before usage. The activation and deactivation of the PDCP duplication function is implemented by the base station (for example, gNB) activating/deactivating the MAC CE. The MAC CE includes bitmap information, and each bit in the bitmap information corresponds to a DRB configured with a PDCP duplication function. When the bit corresponding to the DRB is 1, it means that the DRB is activated, and when the bit corresponding to the DRB is 0, it means that the DRB is deactivated.

After the DRB is activated, the PDCP layer may perform a duplication on the data packet, and transmit the same two duplicated PDCP PDUs to the two RLC entities corresponding to the DRB respectively. The two RLC entities may transmit the duplicated PDCP PDUs respectively.

After the DRB is deactivated, the correspondence between the LCH and the carrier corresponding to the DRB no longer exists. The PDCP layer of the UE no longer performs duplication on the data packet, and the primary RLC entity (i.e., the primary LCH) transmits the data packet. The PDCP entity of the UE may notify the secondary RLC entity to delete data packet buffer in the secondary LCH.

In the DC scenario, the PDCP duplication function uses split bearer as the baseline for duplication. Similar to the CA scenario, the PDCP duplication function can be used merely after the RRC signaling is configured and activated. The activation/deactivation of the PDCP duplication function is realized by the base station (for example, gNB) activating/deactivating the MAC CE. The MAC CE includes bitmap information, and each bit in the bitmap information corresponds to a DRB configured with a PDCP duplication function. The mapping between the DRB and the bitmap is based on DRB ID configured with a duplication function. When the bit corresponding to the DRB is 1, it means that the DRB is activated, and when the bit corresponding to the DRB is 0, it means that the DRB is deactivated.

After the DRB is activated, the PDCP layer may perform duplication on the data packet, and transmit the same two duplicated PDCP PDUs to the two RLC entities corresponding to the DRB respectively. The two RLC entities may transmit the duplicated PDCP PDUs respectively.

After the DRB is deactivated, the UE may fall back to an initial split operation and use its associated configuration to perform a split operation.

In the 15th (Release 15, R15) version of an NR protocol, for each RB, configuration information of PDCP duplication includes following content: (1) a PDCP duplication field, used to indicate whether a PDCP duplication function is configured, wherein when this field appears, it means that an initial state of PDCP duplication is active; (2) a PDCP entity corresponding to RLC1 (for example, LCH1), RLC2 (LCH2) and RLC3 (LCH3); and (3) a cell corresponding to each LCH, wherein this parameter is configured merely in the CA scenario.

In the exiting techniques, under two-legs duplication in both CA and DC scenarios, activation/deactivation MAC CE includes 8 D-fields, 1 byte in total. As shown in Table 1, Di (i is from 0 to 7) represents an activation/deactivation state of DRB i configured with the PDCP duplication function in an RLC entity associated with a same MAC entity, where i is related to DRBs configured with the PDCP duplication function arranged in an ascending order of DRB IDs. Di may be 1 or 0. Di of 1 indicates activating the PDCP duplication function of DRB i, and Di of 0 indicates deactivating the PDCP duplication function of DRB i.

TABLE 1

| D7 | D6 | D5 | D4 | D3 | D2 | D1 | D0 |
| --- | --- | --- | --- | --- | --- | --- | --- |

In the existing techniques, the PDCP duplication function is configured at the granularity of RB, that is, once the PDCP duplication function is indicated by an RB, it means that when the PDCP duplication function is activated, all data packets in the RB must be duplicated.

In the existing techniques, regardless of the activation/deactivation mechanism of CA duplication or DC duplication, one bit is used to indicate whether each DRB is configured with a PDCP duplication function. If the duplication function of the DRB is activated, the PDCP duplication operation is performed, and data transmission may be performed on both legs; if the duplication function of the DRB is deactivated, the PDCP duplication operation is not performed, and merely a primary leg is used for data transmission.

However, for multi-connectivity duplication, the RB configured with the PDCP duplication function may be configured with more than two legs. In this case, for the RB, which legs are used for data transmission cannot be indicated by 1 bit. Therefore, the existing activation/deactivation mechanism is not applicable to multi-connectivity duplication.

In embodiments of the present disclosure, a PDCP duplication function activation method is provided, including: receiving a PDCP duplication function activation signaling from a network, wherein the PDCP duplication function activation signaling includes at least one data offload indication identifier of at least one radio bearer, and the at least one radio bearer is configured with a PDCP duplication function; and determining a duplication number of a data packet of the at least one radio bearer based on the PDCP duplication function activation signaling. With the embodiments of the present disclosure, the data offload indication identifier for multi-connectivity duplication (for example, PDCP duplication combined with DC and CA) may be determined based on the activation signaling configured with the PDCP duplication function, whether to perform data offload during multi-connectivity duplication may be determined based on the data offload indication identifier, and the duplication number of the data packet may be determined accordingly, which may effectively and flexibly activate or deactivate the PDCP duplication function, so that the network may select a leg with better transmission quality based on radio leg transmission quality and other associated factors, thereby improving transmission resource utilization.

In order to clarify the objects, characteristics and advantages of the disclosure, embodiments of present disclosure will be described in detail in conjunction with accompanying drawings.

FIG. 1 is a flow chart of a PDCP duplication function activation method according to an embodiment. The method may be applied in a UE, i.e., performed by the UE. Those skilled in the art could understand that, the method may further be used for deactivating a PDCP duplication function of the UE.

Referring to FIG. 1, the method may include S101 and S102.

In S101, a PDCP duplication function activation signaling is received from a network, wherein the PDCP duplication function activation signaling includes at least one data offload indication identifier of at least one radio bearer, and the at least one radio bearer is configured with a PDCP duplication function.

In S102, a duplication number of a data packet of the at least one radio bearer is determined based on the PDCP duplication function activation signaling.

In some embodiments, a base station (such as NR gNB) at the network may configure first activation configuration information for the UE, where the first activation configuration information is an RRC signaling.

In some embodiments, the first activation configuration information includes: a PDCP duplication field for indicating to configure the PDCP duplication function, a logical channel configured by each PDCP entity, and a cell (i.e., carrier) used by each logical channel.

It should be noted that the base station may use multiple RRC messages to transmit information carried in the first activation configuration information, or use one RRC message to transmit the information carried in the first activation configuration information.

In some embodiments, the PDCP duplication field used for indicating to configure the PDCP duplication function may indicate whether the PDCP duplication function is configured for an RB. When the PDCP duplication field exists, it may also indicate that an initial state is a PDCP duplication function activated state.

In some embodiments, LCHs may correspond to RLC entities in one-to-one correspondence. For example, the first activation configuration information or second activation configuration information may include logical channels LCH1, LCH2 and LCH3 configured by PDCP entities. The logical channel LCH1 corresponds to an RLC entity 1, the logical channel LCH2 corresponds to an RLC entity 2, and the logical channel LCH3 corresponds to the RLC entity 3. Further, based on the LCHs configured by the PDCP entities, i.e., the correspondence between the LCHs and the RLC entities, the correspondence between the PDCP entities and the RLC entities can be obtained.

In some embodiments, an RB configured with a multi-connectivity PDCP duplication function combined with DC and CA may be indicated by a cell group ID and an LCID. Those skilled in the art could understand that an RB that is merely configured with the CA PDCP duplication function may be indicated by the LCID only. Further, an LCH corresponding to an RB configured with the CA PDCP duplication function may also be configured with corresponding carrier parameter information to ensure that cell sets corresponding to different LCHs do not overlap.

Those skilled in the art could understand that for an RB configured with a multi-connectivity PDCP duplication function (for example, a PDCP duplication function combined with DC and CA), if the MAC entity is merely associated with one LCH, the LCH does not need to be configured with cell parameter information. That is, when the PDCP duplication function is activated, the data packet of the LCH may be transmitted through any cell corresponding to the MAC entity. If the MAC entity is associated with multiple LCHs, the multiple LCHs need to be configured with cell parameter information to ensure that cell sets corresponding to the multiple LCHs do not overlap.

After obtaining the first activation configuration information, the base station may transmit the first activation configuration information to the UE through an RRC signaling, so that the UE can indicate the at least one logical channel actually used by the PDCP duplication function based on the PDCP duplication function activation signaling.

Alternatively, the base station may configure second activation configuration information for the UE, where the second activation configuration information is an RRC message.

In some embodiments, the second activation configuration information includes: a PDCP duplication field for indicating to configure the PDCP duplication function, a logical channel configured by each PDCP entity, priorities of logical channels, and a carrier used by each logical channel.

It should be noted that the base station may use multiple RRC messages to transmit information carried in the first activation configuration information or the second activation configuration information, or use one RRC message to transmit the information carried in the first activation configuration information and the second activation configuration information.

In some embodiments, the PDCP duplication function is a PDCP duplication function combined with DC and CA, and in the second activation configuration information, priorities of logical channels belonging to a master node and priorities of logical channels belonging to a secondary node may be separately ordered.

In some embodiments, when the PDCP duplication function is a PDCP duplication function combined with DC and CA, LCHs are divided into two groups, one group of LCH belongs to the master node, and forms a master node LCH group, and the other group of LCH belongs to the secondary node and forms a secondary node LCH group. In this case, the second activation configuration information may first arrange an order of the master node LCH group and the secondary node LCH group, and then sort the LCHs in the master node LCH group and the LCHs in the secondary node LCH group to obtain priorities of the LCHs.

The second activation configuration information may arrange the priorities of the LCHs of the master node and the secondary node in an order of the master node LCH group first and the secondary node LCH group last. Afterward, the priorities of the LCHs in the master node LCH group or in the secondary node LCH group may be arranged in an ascending order of LCID.

Alternatively, the second activation configuration information may arrange the priorities of the LCHs of the master node and the secondary node in the order of the master node LCH group first and the secondary node LCH group last. Afterward, the priorities of the LCHs in the master node LCH group or in the secondary node LCH group may be arranged in a descending order of LCID.

Alternatively, the second activation configuration information may arrange the priorities of the LCHs of the master node and the secondary node in an order of the secondary node LCH group first and the master node LCH group last. Afterward, the priorities of the LCHs in the master node LCH group or in the secondary node LCH group may be arranged in an ascending order of LCID.

Alternatively, the second activation configuration information may arrange the priorities of the LCHs of the master node and the secondary node in an order of the secondary node LCH group first and the master node LCH group last. Afterward, the priorities of the LCHs in the master node LCH group or in the secondary node LCH group may be arranged in a descending order of LCID.

For example, an RB corresponds to 5 LCHs, including LCH1, LCH2, LCH3, LCH4' and LCH5'. LCH1, LCH2 and LCH3 belong to a master node, and LCH4' and LCH5' belong to a secondary node. If the second activation configuration information arranges the priorities in the order of the master node LCH group first and the secondary node LCH group last, and the priorities of LCHs in the master node LCH group or in the secondary node LCH group are arranged in an ascending order of LCID, a priority order of the LCHs in the second activation configuration information may be as follows: each LCH belonging to the master node has a higher priority than each LCH belonging to the secondary node, LCH1 has the highest priority, and LCH5' has the lowest priority.

Alternatively, in the second activation configuration information, priorities of logical channels belonging to a master node and priorities of logical channels belonging to a secondary node may be ordered uniformly. In this condition, the second activation configuration information does not distinguish whether an LCH belongs to the master node or the secondary node, and the priority of each LCH may be directly configured. For example, a priority order of the LCHs is as follows: LCH1, LCH4', LCH2, LCH3 and LCH5', which indicates that LCH1 belonging to the master node has the highest priority, LCH4' belonging to the secondary node has the second highest priority, and LCH5' belonging to the secondary node has the lowest priority.

After obtaining the second activation configuration information, the base station may transmit the second activation configuration information to the UE through an RRC signaling, so that the UE may indicate the at least one logical channel actually used by the PDCP duplication function based on the PDCP duplication function activation signaling.

Further, the base station may determine the PDCP duplication function activation signaling to activate the PDCP duplication function.

In some embodiments, the PDCP duplication function activation signaling may include at least one data offload indication identifier of RB. The data offload indication may be 0 or 1, to indicate whether the RB is allowed to perform data offload.

In some embodiments, the PDCP duplication function activation signaling may further include indication information used to indicate LCHs used by the at least one radio bearer. There may be more than 3 LCHs associated with each radio bearer, but a number of LCHs (that is, used LCHs) activated by the base station may be less than a number of LCHs associated with the radio bearer. For example, the number of LCHs used by the radio bearer is two.

In some embodiments, the number of RBs configured with the PDCP duplication function may be one or more. When the number of RBs configured with the PDCP duplication function is one, the PDCP duplication function activation signaling may include one indication information. In this case, the data offload indication identifiers may correspond to the RBs configured with the PDCP duplication function in one-to-one correspondence, and the data offload indication identifiers may be disposed before or after the indication information of the corresponding RBs (for example, all bits of the corresponding legs or LCHs).

When there are a plurality of RBs configured with the PDCP duplication function, the PDCP duplication function activation signaling may include a plurality of data offload indication identifiers and a plurality of pieces of indication information. The plurality of pieces of indication information have a one-to-one correspondence with the plurality of RBs, and may be arranged in an ascending or descending order based on radio bearer identifiers of the radio bearers. In this case, the data offload indication identifiers may have a one-to-one correspondence with the RBs configured with the PDCP duplication function, and may be disposed before or after the indication information of the corresponding RBs. Alternatively, the data offload indication identifiers merely correspond to some of the RBs in a one-to-one correspondence, and may be disposed before or after the indication information of the corresponding RBs.

In some embodiments, if the base station transmits the first activation configuration information, each indication information may use a bitmap to indicate a usage status of the LCH configured for each radio bearer. The usage status of the LCH is indicated by 0 or 1. For example, if the usage status is 0, it means that the LCH corresponding to the bit is not used, that is, the PDCP duplication function corresponding to the LCH is not activated; if the usage status is 1, it means that the LCH corresponding to the bit is used, that is, the PDCP duplication function corresponding to the LCH is activated.

When the bitmap is used to indicate the usage status of the LCHs configured for the radio bearer, the LCHs may be sorted in an ascending or descending order based on LCID. Specifically, when the bitmap is adopted, each bit is associated with one LCH. The LCHs may be sorted in an ascending or descending order based on the LCID.

In some embodiments, when the PDCP duplication function is a CA PDCP duplication function, in the indication information, the LCHs may be arranged in an ascending or descending order of the LCID.

Those skilled in the art could understand that in practice, for example, if the LCHs include LCH1, LCH2 and LCH3, and the UE and the base station pre-negotiate that the LCHs indicated by the indication information are arranged in an ascending order of LCID, the indication information may include 3 bits of LCH1, LCH2 and LCH3.

Alternatively, when the PDCP duplication function is a PDCP duplication function combined with DC and CA, in the indication information, the indication identifiers of the LCHs may be divided into two groups for record, where one group of LCH belongs to the master node, and the other group of LCH belongs to the secondary node. The indication identifiers of the logical channels in each group may be arranged in an ascending order or in a descending order based on LCID. For example, the LCHs of the RB includes LCH1, LCH2, LCH3, LCH4' and LCH5'. LCH1, LCH2 and LCH3 belong to the master node, and LCH4' and LCH5' belong to the secondary node. For example, when an arrange order in the indication information is master node LCHs first and secondary node LCHs last, and each group of LCHs are arranged in an ascending order of LCID, the LCHs indicated by the indication information are LCH1, LCH2, LCH3, LCH4' and LCH5' in sequence. For another example, when an arrange order in the indication information is secondary node LCHs first and master node LCHs last, and each group of LCHs are arranged in a descending order of LCID, the LCHs indicated by the indication information are LCH5', LCH4', LCH3, LCH2 and LCH1 in sequence.

Further, for any leg (for example, LCH) associated with the RB configured with the PDCP duplication function, every 1 bit is used to indicate whether to use the leg for data transmission. For example, when the bit is 1, it may indicate that the LCH corresponding to the leg is used; when the bit is 0, it indicates that the LCH corresponding to the leg is not used.

For example, three LCHs of a particular RB are LCH1, LCH2 and LCH3. If the LCHs indicated by the indication information are arranged in an ascending order of LCID, when the indication information is "110", it means that a bit value of LCH1 is 1, a bit value of LCH2 is 1, and a bit value of LCH3 is 0, that is, the RB configured with the PDCP duplication function uses LCH1 and LCH2 to duplicate and transmit data, but does not use LCH3 to transmit data.

Alternatively, the indication information is "11010", and it is known that LCHs indicated by the indication information are LCH1, LCH2, LCH3, LCH4' and LCH5' in order. It can be seen that a bit value corresponding to LCH1 is 1, a bit value corresponding to LCH2 is 1, a bit value corresponding to LCH3 is 0, a bit value corresponding to LCH4' is 1, and a bit value corresponding to LCH5' is 0. Based on each bit value, it can be known that the RB configured with the PDCP duplication function uses LCH1, LCH2 and LCH4' legs to transmit data, and does not use LCH3 in the master node LCH group and LCH5' in the secondary node LCH group to transmit data.

Alternatively, if the base station transmits the second activation configuration information, the indication information may include the number of logical channels used by the radio bearer. In some embodiments, the UE may determine the logical channels used by the radio bearer based on the number of logical channels in the indication information and priorities of the logical channels in the second activation configuration information.

Alternatively, the PDCP duplication function is a CA PDCP duplication function, and the indication information indicates the number of LCHs used by the PDCP duplication function, i.e., the number of activated legs. In this case, after receiving the indication information, the UE may obtain the priorities of the LCHs based on the second activation configuration information, and in combination with the number of LCHs used, the LCHs for data transmission are further learned.

Alternatively, the PDCP duplication function is a PDCP duplication function combined with DC and CA, and the number of LCHs belonging to the master node used by each RB in the indication information and the number of LCHs belonging to the secondary node used by the RB are separately recorded. For example, for the RB configured with the PDCP duplication function combined with DC and CA, the number of active legs on a side of the master node and the number of active legs on a side of the secondary node may be respectively indicated. The UE uses legs at each side whose number is equal to the number of the indicated LCHs and priorities are relatively high for data transmission by default.

Figure 2:
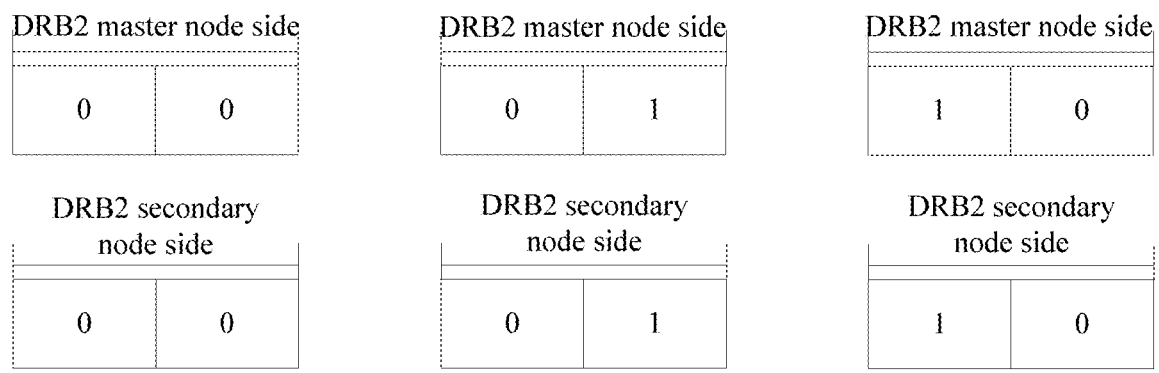
FIG. 2 is a frame structure diagram of an activation and deactivation signaling according to an embodiment.

FIG. 2 is a structure diagram of indication information according to an embodiment. If indication information on a master node side of a data radio bearer DRB2 is "00", it indicates that one leg is used on the master node side; if indication information on the master node side of the data radio bearer DRB2 is "01", it indicates that two legs are used on the master node side; or if indication information on the master node side of the data radio bearer DRB2 is "10", it indicates that three legs are used on the master node side. Accordingly, if indication information on a secondary node side of the data radio bearer DRB2 is "00", it indicates that one leg is used on the secondary node side; if indication information on the secondary node side of the data radio bearer DRB2 is "01", it indicates that two legs are used on the secondary node side; or if indication information on the secondary node side of the data radio bearer DRB2 is "10", it indicates that three legs are used on the secondary node side.

In some embodiments, the PDCP duplication function is a PDCP duplication function combined with DC and CA, and the indication information may respectively indicate the number of LCHs used by the master node, i.e., the number of active legs on the master node side, and the number of LCHs used by the secondary node, i.e., the number of active legs on the secondary node side. The UE may obtain the number of LCHs with relatively high priority in combination with the second activation configuration information, and further learn the LCHs for data transmission.

For example, the indication information of bit "11" indicates the use of 4 LCHs (or called legs) with the first four highest priorities, the indication information of bit "10" indicates the use of 3 LCHs (or called legs) with the first three highest priorities, the indication information of bit "01" indicates the use of 2 LCHs (or called legs) with the first two highest priorities, and the indication information of bit "00" indicates the use of 1 LCH (or called leg) with the highest priority. As shown in Table 2, every 2 bits in Table 2 represent a DRB indication information. In this case, DRB1 may use 4 LCHs (or called legs) with the first four highest priorities, DRB2 may use 3 LCHs (or called legs) with the first three highest priorities, DRB3 may use 2 LCHs (or called legs) with the first two highest priorities, and DRB4 may use 1 LCH (or called leg) with the highest priority.

TABLE 2

| DRB | DRB1 | | DRB2 | | DRB3 | | DRB4 | |
|---|---|---|---|---|---|---|---|---|
| bit | 1 | 1 | 1 | 0 | 0 | 1 | 0 | 0 |

In some embodiments, whether the CA PDCP duplication function is activated or the PDCP duplication function combined with DC and CA is activated, two methods can be used to calculate the number of bits of the PDCP duplication function of each RB. One method is to predefine that each RB can be configured with at most N legs, and then the number of bits required at least is calculated. Afterward, for all RBs, as the number of configured legs is not greater than N, the number of bits calculated above can indicate a condition of activating all legs. In this case, even if the number of legs changes, the number of bits does not need to be changed. The other method does not limit the number of legs configured for the RB. In this case, for each RB, as the UE knows a maximum number of configurable legs for the RB, the number of bits required at least can be calculated. In this case, the number of bits of the leg used by each RB is associated with the number of legs configured for each RB. The number of bits of different RBs may be different, and when the leg changes, the number of bits may also change.

In S102, the UE may determine the duplication number of the data packet of the RB based on the PDCP duplication function activation signaling, and duplicate the data packet. An RRC message, a MAC CE, or a physical layer message may be used to transmit the PDCP duplication function activation signaling, which is not limited here.

In some embodiments, if the UE receives the first activation configuration information and the data offload indication in the activation signaling indicates that the UE is allowed to perform the data offload operation, the PDCP entity first determines whether to perform the data offload operation. Specifically, a data amount of the data packet in the PDCP entity is compared with a preset offload threshold first, and if the data amount is greater than or equal to the preset offload threshold, data offload, duplication and transmission may be performed to the data in the PDCP entity.

More specifically, the PDCP entity may divide the data packet into a first data packet and a second data packet. Afterward, the first data packet and the second data packet are duplicated. The first data packet refers to a data packet transmitted through a master node, and the second data packet refers to a data packet transmitted through a secondary node.

Before duplication, the duplication number needs to be determined, and may be determined based on the indication information of the RB. In some embodiments, the duplication number may be determined based on the number of LCHs used by the RB. After the LCHs belonging to the master node are determined, the duplication number of the first data packet may be determined based on the number of LCHs with a bit value of 1 among the LCHs (for example, the first LCH) belonging to the master node in the indication information. Accordingly, after the LCHs belonging to the secondary node are determined, the duplication number of the second data packet may be determined based on the number of LCHs (for example, the second LCH) with a bit value of 1 among the LCHs belonging to the secondary node in the indication information. Afterward, the first data packets obtained by duplication may be transmitted to their corresponding first LCHs or legs respectively, and the second data packets obtained by duplication may be transmitted to their corresponding second LCHs or legs respectively.

In some embodiments, after the data offload operation is completed, the PDCP entity may perform PDCP duplication on the data of the master node and the secondary node respectively. For the master node, the duplication number N1 of the first data packet is obtained based on the number of LCHs with a bit value of 1 in an indication identifier of each leg (for example, LCH) activated by the master node corresponding to the RB, and then the first data packet distributed to the master node is duplicated to generate N1 first data packets which are respectively delivered to the legs with the bit value of 1 in each LCH indication identifier corresponding to the master node.

For the secondary node, the duplication number of the second data packet N2 is obtained based on the number of LCHs with a bit value of 1 in each LCH indication identifier in the secondary node corresponding to the RB, and then the second data packet distributed to the secondary node is duplicated to generate N2 second data packets which are respectively delivered to the legs with the bit value of 1 in each LCH indication identifier corresponding to the secondary node.

Alternatively, if the data amount is less than the preset offload threshold, the number of logical channels used by the radio bearer may be determined based on the indication information, and a corresponding number of data packets may be duplicated for transmission. Specifically, all data packets may be transmitted to the legs corresponding to the master node to be duplicated, and based on the number N3 of legs activated by the master node corresponding to the RB, each data packet may be duplicated to generate N3 data packets which are delivered to the legs with the bit value of 1 in each LCH indication identifier corresponding to the master node.

In some embodiments, when the data offload indication identifier indicates that no data offload is to be performed, the PDCP duplication may be directly performed on the data packet. Specifically, based on the number of LCHs with a bit value of 1 in each LCH indication identifier corresponding to the RB, each data packet may be duplicated by a corresponding number, and the duplicated data packets are delivered to legs whose bit value is 1 in the LCH indication identifier.

Alternatively, if the UE receives the second activation configuration information, and the data offload indication identifier in the PDCP duplication function activation signaling indicates that the UE is allowed to perform data offload, the PDCP entity first determines whether to perform data offload. Specifically, the data amount of the data packet in the PDCP entity is compared with a preset offload threshold first, and if the data amount is greater than or equal to the preset offload threshold, perform data offload, duplication and transmission to data in the PDCP entity.

More specifically, the PDCP entity may divide the data packet into a first data packet and a second data packet, and then duplicate the first data packet and the second data packet.

The first data packet refers to a data packet transmitted through a master node, and the second data packet refers to a data packet transmitted through a secondary node.

Before duplication, the duplication number needs to be determined, and may be determined based on the indication information of RB. In some embodiments, the duplication number may be determined based on the number of LCHs used by the RB.

After the data offload is completed, the PDCP entity may perform PDCP duplication on the data of the master node and the secondary node respectively. If the LCH used by the first data packet (for example, the first LCH) belongs to the master node, for the master node, the first data packet distributed to the master node is duplicated based on the number of active legs of the master node corresponding to the RB, and the duplicated first data packets are respectively transmitted to the legs of the master node who have relatively high priority and whose number is equal to the indicated number of LCHs. For the secondary node, the second data packet distributed to the master node is duplicated based on the number of active legs of the secondary node corresponding to the RB, and the duplicated second data packets are respectively transmitted to the legs of the secondary node who have relatively high priority and whose number is equal to the indicated number of LCHs.

Alternatively, if the data amount is less than the preset offload threshold, the number of logical channels used by the radio bearer may be determined based on the indication information, and a corresponding number of data packets may be duplicated for transmission. Specifically, all data packets may be transmitted to the leg corresponding to the master node to be duplicated. Based on the number of legs activated by the master node corresponding to the RB, each data packet may be duplicated to generate corresponding number of duplicated data packets which are respectively delivered to the legs of the master node associated with the LCHs with relatively high priorities.

In some embodiments, if the data offload indication identifier indicates that no data offload is to be performed, the PDCP duplication operation may be directly performed on the data, and the duplicated data packets are transmitted to the respective activated legs of the master node and the secondary node. Specifically, the PDCP entity may determine the duplication number based on a number of the active legs of the master node and the secondary node corresponding to the RB, and duplicate the data packet to generate the corresponding number of duplicated data packets which are respectively delivered to the legs of the master node and the secondary node who have relatively high priorities and whose number is equal to the number of LCHs.

Figure 3:
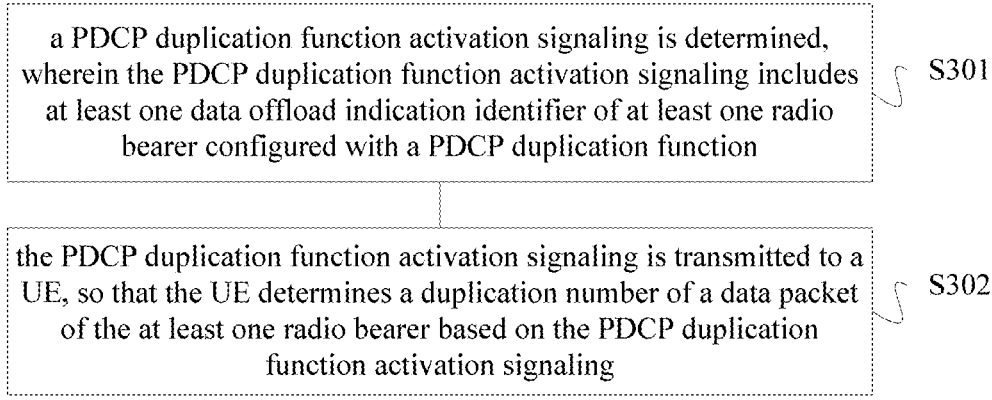
FIG. 3 is a flow chart of a PDCP duplication function activation method according to an embodiment.

FIG. 3 is a flow chart of a PDCP duplication function activation method according to an embodiment. The method may be applied in a network side, for example, performed by a base station. Referring to FIG. 3, the method may include S301 and S302.

In S301, a PDCP duplication function activation signaling is determined, wherein the PDCP duplication function activation signaling includes at least one data offload indication identifier of at least one radio bearer configured with a PDCP duplication function.

In S302, the PDCP duplication function activation signaling is transmitted to a UE, so that the UE determines a duplication number of a data packet of the at least one radio bearer based on the PDCP duplication function activation signaling.

In some embodiments, the base station may configure first activation configuration information or second activation configuration information. The first activation configuration information includes: a PDCP duplication field for indicating to configure the PDCP duplication function, a logical channel configured by each PDCP entity, and a carrier used by each logical channel.

The second activation configuration information includes: a PDCP duplication field for indicating to configure the PDCP duplication function, a logical channel configured by each PDCP entity, priorities of logical channels, and a carrier used by each logical channel.

In some embodiments, the PDCP duplication function is a PDCP duplication function combined with DC and CA, and in the second activation configuration information, priorities of logical channels belonging to a master node and priorities of logical channels belonging to a secondary node are separately ordered, or, priorities of logical channels belonging to a master node and priorities of logical channels belonging to a secondary node are uniformly ordered.

After obtaining the first activation configuration information or the second activation configuration information, the base station may use an RRC signaling to transmit the first activation configuration information or the second activation configuration information. It should be noted that information carried in the first activation configuration information and the second activation configuration information may be transmitted via multiple RRC signalings, or via one RRC signaling.

In S301, the base station may determine the PDCP duplication function activation signaling which includes at least one data offload indication identifier of at least one radio bearer configured with a PDCP duplication function, so that the UE determines whether to perform data offload for the radio bearer based on the data offload indication identifier.

In some embodiments, the PDCP duplication function activation signaling further includes indication information, wherein the indication information is used to indicate at least one logical channel used by the at least one radio bearer which is selected from logical channels configured by the at least one radio bearer. In some embodiments, the at least one data offload indication identifier is disposed before or after the indication information of the at least one radio bearer.

In some embodiments, when the at least one radio bearer includes a plurality of radio bearers, the PDCP duplication function activation signaling includes a plurality of data offload indication identifiers and a plurality of pieces of indication information, wherein the plurality of data offload indication identifiers and the plurality of pieces of indication information correspond to the plurality of radio bearers respectively, and are arranged in an ascending or descending order of radio bearer identifiers of the plurality of radio bearers.

In some embodiments, the indication information uses a bitmap to indicate a usage status of the at least one logical channel configured by the at least one radio bearer.

In some embodiments, the PDCP duplication function is a PDCP duplication function combined with DC and CA, and in the indication information, indication identifiers of logical channels are recorded in two groups, wherein the indication identifiers of the logical channels in each group are arranged in an ascending or descending order of LCID, one group of logical channels belongs to a master node, and the other group of logical channels belongs to a secondary node.

Alternatively, in some embodiments, the indication information includes a number of logical channels used by the at least one radio bearer, so that the UE determines the logical channels used by the at least one radio bearer based on the number of the logical channels and the priorities of the logical channels.

In some embodiments, the PDCP duplication function is a PDCP duplication function combined with DC and CA, and in the indication information, a number of logical channels used by the at least one radio bearer which belong to a master node and a number of logical channels used by the at least one radio bearer which belong to a secondary node are separately recorded.

Those skilled in the art could understand that S301 to S302 can be regarded as steps corresponding to S101 to S102 in the embodiment as shown in FIG. 1, and the two are complementary to each other in terms of specific implementation principles and logic. Therefore, explanation of terms involved in the embodiment as shown in FIG. 3 can be referred to related descriptions of the embodiment as shown in FIG. 1, and is not described in detail here.

Signaling interaction between a UE and a network (for example, an NR base station) adopting the embodiments of the present disclosure is further described below in conjunction with a typical application scenario.

Figure 4:
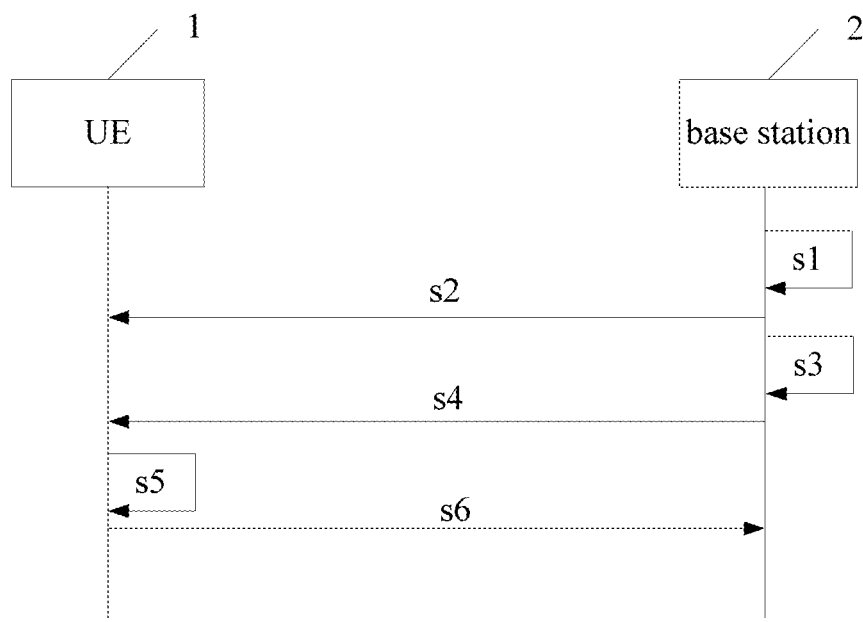
FIG. 4 is a signaling interaction diagram of a typical application scenario according to an embodiment.

In a typical application scenario, referring to FIG. 4, after a UE 1 establishes a connection with a base station 2, the base station 2 may perform s1, that is, determine first activation configuration information or the second activation configuration information.

Afterward, the base station 2 may perform s2, that is, transmit the first activation configuration information or the second activation configuration information to the UE 1.

After receiving the first activation configuration information, the UE 1 may determine an RB that uses a PDCP duplication function, logical channel configured by the RB, and a carrier used by each logical channel.

Alternatively, after receiving the second activation configuration information, the UE 1 may determine the RB that uses the PDCP duplication function, logical channels configured by the RB, priorities of the logical channels, and a carrier used by each logical channel.

Afterward, the base station 2 may perform s3, that is, determine a PDCP duplication function activation signaling. The PDCP duplication function activation signaling may include a data offload indication identifier of a radio bearer configured with the PDCP duplication function, and indication information used to indicate at least one logical channel the radio bearer uses, and the at least one logical channel used by the radio bearer is selected from logical channels configured by the radio bearer.

Afterward, the base station 2 may perform s4, that is, transmit the PDCP duplication function activation signaling to the UE 1.

In some embodiments, the UE 1 may perform s5, that is, after receiving the PDCP duplication function activation signaling, duplicate each data packet based on specific information in the PDCP duplication function activation signaling, and determine whether to perform data offload and legs for transmitting the duplicated data packets.

Further, the UE 1 may perform s6, that is, transmit data obtained by PDCP duplication via multiple legs.

More details on working principles and working methods of the UE 1 and the base station 2 in the application scenario as shown in FIG. 4 may be referred to related descriptions of FIG. 1 to FIG. 3, and are not described in detail here.

From above, with the embodiments of the present disclosure, a multi-connectivity PDCP duplication function may be indicated flexibly and effectively. After a duplication number and legs to be used are determined, duplicated data packets may be transmitted via the legs to be used.

Figure 5:
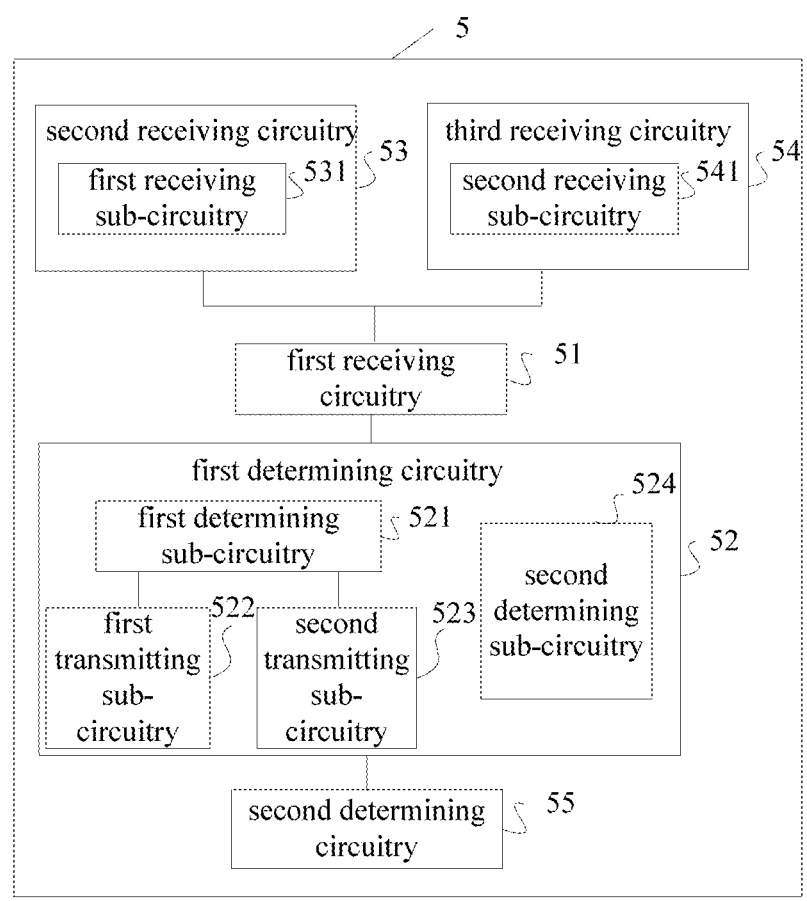
FIG. 5 is a structural diagram of a PDCP duplication function activation device according to an embodiment.

FIG. 5 is a structural diagram of a PDCP duplication function activation device according to an embodiment. Referring to FIG. 5, the PDCP duplication function activation device 5 may be applied to a UE. Those skilled in the art could understand that the device may be used to implement technical solutions of the above PDCP duplication function activation method as shown in FIG. 1, FIG. 2 and FIG. 4.

In some embodiments, the device 5 may include a first receiving circuitry 51 and a first determining circuitry 52.

In some embodiments, the first receiving circuitry 51 is configured to receive a PDCP duplication function activation signaling from a network, wherein the PDCP duplication function activation signaling includes at least one data offload indication identifier of at least one radio bearer, and the at least one radio bearer is configured with a PDCP duplication function; and the first determining circuitry 52 is configured to determine a duplication number of a data packet of the at least one radio bearer based on the PDCP duplication function activation signaling.

In some embodiments, the PDCP duplication function activation signaling further includes indication information, wherein the indication information is used to indicate at least one logical channel used by the at least one radio bearer which is selected from logical channels configured by the at least one radio bearer.

In some embodiments, when the at least one radio bearer includes a plurality of radio bearers, the PDCP duplication function activation signaling includes a plurality of data offload indication identifiers and a plurality of pieces of indication information, wherein the plurality of data offload indication identifiers and the plurality of pieces of indication information correspond to the plurality of radio bearers respectively, and are arranged in an ascending or descending order of radio bearer identifiers of the plurality of radio bearers.

In some embodiments, the device 5 further includes a second receiving circuitry 53 configured to receive first activation configuration information from the network before the PDCP duplication function activation signaling is received from the network, wherein the first activation configuration information includes: a PDCP duplication field for indicating to configure the PDCP duplication function, a logical channel configured by each PDCP entity, and a carrier used by each logical channel.

In some embodiments, the second receiving circuitry 53 includes a first receiving sub-circuitry 531 configured to receive the first activation configuration information from the network via an RRC signaling.

In some embodiments, the indication information uses a bitmap to indicate a usage status of the at least one logical channel configured by the at least one radio bearer.

In some embodiments, the PDCP duplication function is a PDCP duplication function combined with DC and CA, and in the indication information, indication identifiers of logical channels are recorded in two groups, wherein the indication identifiers of the logical channels in each group are arranged in an ascending or descending order of LCID, one group of logical channels belongs to a master node, and the other group of logical channels belongs to a secondary node.

In some embodiments, the device 5 further includes a third receiving circuitry 54 configured to receive second activation configuration information from the network before the PDCP duplication function activation signaling is received from the network, wherein the second activation configuration information includes: a PDCP duplication field for indicating to configure the PDCP duplication function, a logical channel configured by each PDCP entity, priorities of logical channels, and a carrier used by each logical channel.

In some embodiments, the PDCP duplication function is a PDCP duplication function combined with DC and CA, and in the second activation configuration information, priorities of logical channels belonging to a master node and priorities of logical channels belonging to a secondary node are separately ordered, or, priorities of logical channels belonging to a master node and priorities of logical channels belonging to a secondary node are uniformly ordered.

In some embodiments, the third receiving circuitry 54 includes a second receiving sub-circuitry 541 configured to receive the second activation configuration information from the network via an RRC signaling.

In some embodiments, the indication information includes a number of logical channels used by the at least one radio bearer, and the device 5 further includes a second determining circuitry 55 configured to determine the logical channels used by the at least one radio bearer based on the number of the logical channels and the priorities of the logical channels.

In some embodiments, the PDCP duplication function is a PDCP duplication function combined with DC and CA, and in the indication information, a number of logical channels used by the at least one radio bearer which belong to a master node and a number of logical channels used by the at least one radio bearer which belong to a secondary node are separately recorded.

In some embodiments, the first determining circuitry 52 includes a first determining sub-circuitry 521, a first transmitting sub-circuitry 522 and a second transmitting sub-circuitry 523. The first determining sub-circuitry 521 is configured to: when the at least one data offload indication identifier indicates that the at least one radio bearer is allowed to perform data offload, determine whether a data amount of the data packet is greater than or equal to a preset offload threshold. The first transmitting sub-circuitry 522 is configured to: if the data amount of the data packet is greater than or equal to the preset offload threshold, divide the data packet into a first data packet and a second data packet; determine a number of first logical channels used by the at least one radio bearer and a number of second logical channels used by the at least one radio bearer based on the indication information, to obtain a duplication number of the first data packet and a duplication number of the second data packet; duplicate the first data packet and the second data packet based on the duplication number of the first data packet and the duplication number of the second data packet; and transmit data packets obtained by duplicating the first data packet to the first logical channels, and transmit data packets obtained by duplicating the second data packet to the second logical channels.

The second transmitting sub-circuitry 523 is configured to: if the data amount of the data packet is less than the preset offload threshold, determine a number of third logical channels used by the at least one radio bearer based on the indication information, to obtain the duplication number of the data packet; duplicate the data packet based on the duplication number of the data packet; and transmit data packets obtained by duplicating the data packet to the third logical channels. The first data packet refers to a data packet transmitted through a master node, the second data packet refers to a data packet transmitted through a secondary node, the first logical channels belong to the master node, the second logical channels belong to the secondary node, and the third logical channels belong to the master node.

In some embodiments, the first determining circuitry 52 includes a second determining sub-circuitry 524 configured to: when the at least one data offload indication identifier indicates that the at least one radio bearer does not perform data offload, determine the number of logical channels used by the at least one radio bearer based on the indication information to obtain the duplication number of the data packet; duplicate the data packet based on the duplication number of the data packet; and transmit data packets obtained by duplicating the data packet to the logical channels.

More details on working principles and working methods of the device 5 may be referred to related descriptions of FIG. 1, FIG. 2 and FIG. 4, and are not described in detail here.

Figure 6:
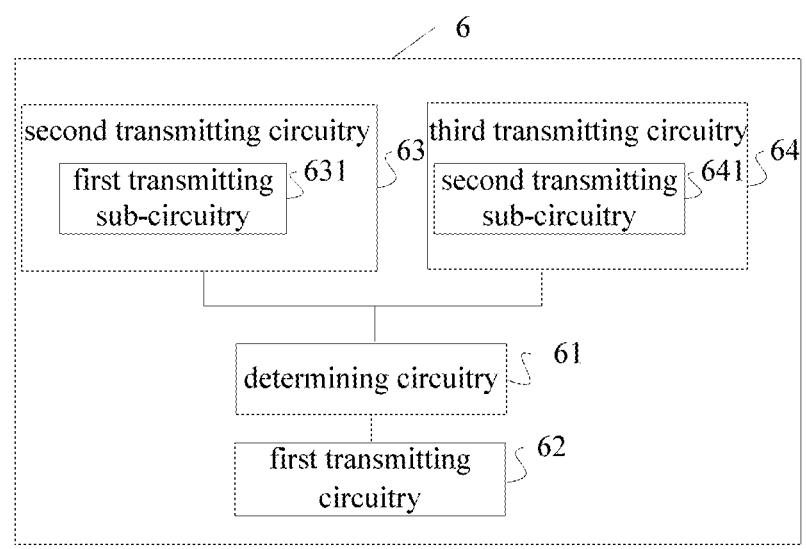
FIG. 6 is a structural diagram of a PDCP duplication function activation device according to an embodiment.

FIG. 6 is a structural diagram of a PDCP duplication function activation device according to an embodiment. Referring to FIG. 6, the PDCP duplication function activation device 6 may be applied to a network side, such as a base station, and be used to implement technical solutions of the above PDCP duplication function activation method as shown in FIG. 3.

In some embodiments, the device 6 may include: a determining circuitry 61 configured to determine a PDCP duplication function activation signaling, wherein the PDCP duplication function activation signaling includes at least one data offload indication identifier of at least one radio bearer configured with a PDCP duplication function; and a first transmitting circuitry 62 configured to transmit the PDCP duplication function activation signaling to a UE, so that the UE determines a duplication number of a data packet of the at least one radio bearer based on the PDCP duplication function activation signaling.

In some embodiments, the PDCP duplication function activation signaling further includes indication information, wherein the indication information is used to indicate at least one logical channel used by the at least one radio bearer which is selected from logical channels configured by the at least one radio bearer.

In some embodiments, when the at least one radio bearer includes a plurality of radio bearers, the PDCP duplication function activation signaling includes a plurality of data offload indication identifiers and a plurality of pieces of indication information, wherein the plurality of data offload indication identifiers and the plurality of pieces of indication information correspond to the plurality of radio bearers respectively, and are arranged in an ascending or descending order of radio bearer identifiers of the plurality of radio bearers.

In some embodiments, the device 6 further includes a second transmitting circuitry 63 configured to: before the PDCP duplication function activation signaling is determined, transmit first activation configuration information to the UE, wherein the first activation configuration information includes: a PDCP duplication field for indicating to configure the PDCP duplication function, a logical channel configured by each PDCP entity, and a carrier used by each logical channel. The at least one data offload indication identifier is disposed before or after the indication information of the at least one radio bearer.

In some embodiments, the second transmitting circuitry 63 includes a first transmitting sub-circuitry 631 configured to transmit the first activation configuration information to the UE via an RRC signaling.

In some embodiments, the indication information uses a bitmap to indicate a usage status of the at least one logical channel configured by the at least one radio bearer.

In some embodiments, the PDCP duplication function is a PDCP duplication function combined with DC and CA, and in the indication information, indication identifiers of logical channels are recorded in two groups, wherein the indication identifiers of the logical channels in each group are arranged in an ascending or descending order of LCID, one group of logical channels belongs to a master node, and the other group of logical channels belongs to a secondary node.

In some embodiments, the PDCP duplication function is a PDCP duplication function combined with DC and CA, and in the indication information, a number of logical channels used by the at least one radio bearer which belong to a master node and a number of logical channels used by the at least one radio bearer which belong to a secondary node are separately recorded.

In some embodiments, the device 6 further includes a third transmitting circuitry 64 configured to: before the PDCP duplication function activation signaling is determined, transmit second activation configuration information to the UE, wherein the second activation configuration information includes: a PDCP duplication field for indicating to configure the PDCP duplication function, a logical channel configured by each PDCP entity, priorities of logical channels, and a carrier used by each logical channel.

In some embodiments, the third transmitting circuitry 64 includes a second transmitting sub-circuitry 641 configured to transmit the second activation configuration information to the UE via an RRC signaling.

In some embodiments, the indication information includes a number of logical channels used by the at least one radio bearer, so that the UE determines the logical channels used by the at least one radio bearer based on the number of the logical channels and the priorities of the logical channels.

In some embodiments, the PDCP duplication function is a PDCP duplication function combined with DC and CA, and in the second activation configuration information, priorities of logical channels belonging to a master node and priorities of logical channels belonging to a secondary node are separately ordered, or, priorities of logical channels belonging to a master node and priorities of logical channels belonging to a secondary node are uniformly ordered.

More details on working principles and working methods of the device 6 may be referred to related descriptions of FIG. 2, FIG. 3 and FIG. 4, and are not described in detail here.

In an embodiment of the present disclosure, a storage medium having computer instructions stored therein is provided, wherein when the computer instructions are executed, any one of the above methods as shown in FIG. 1 to FIG. 4 is performed. In some embodiments, the storage medium may include a computer readable storage medium. The storage medium may include a Read Only Memory (ROM), a Random Access Memory (RAM), a magnetic disk or an optical disk.

In an embodiment of the present disclosure, a terminal including a memory and a processor is provided, wherein the memory has computer instructions stored therein, and when the processor executes the computer instructions, any one of the above methods as shown in FIG. 1, FIG. 2 and FIG. 4 is performed. The base station and the UE may interact with each other. Specifically, the terminal may be the UE.

In an embodiment of the present disclosure, a base station including a memory and a processor is provided, wherein the memory has computer instructions stored therein, and when the processor executes the computer instructions, any one of the above methods as shown in FIG. 3 and FIG. 4 is performed. Specifically, the base station may be an NR base station.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A Packet Data Convergence Protocol (PDCP) duplication function activation method, comprising:
receiving a PDCP duplication function activation signaling from a network, wherein the PDCP duplication function activation signaling comprises at least one data offload indication identifier of at least one radio bearer, and the at least one radio bearer is configured with a PDCP duplication function; and
determining a duplication number of a data packet of the at least one radio bearer based on the PDCP duplication function activation signaling;
wherein the PDCP duplication function activation signaling further comprises indication information,
wherein said determining the duplication number of the data packet of the at least one radio bearer based on the PDCP duplication function activation signaling comprises:
based on that the at least one data offload indication identifier indicates that the at least one radio bearer is allowed to perform data offload, determining whether a data amount of the data packet is greater than or equal to a preset offload threshold;
in response to the data amount of the data packet being greater than or equal to the preset offload threshold, dividing the data packet into a first data packet and a second data packet, and determining a number of first logical channels used by the at least one radio bearer and a number of second logical channels used by the at least one radio bearer based on the indication information, to obtain a duplication number of the first data packet and a duplication number of the second data packet; and in response to the data amount of the data packet being less than the preset offload threshold, determining a number of third logical channels used by the at least one radio bearer based on the indication information, to obtain the duplication number of the data packet, wherein the first data packet refers to a data packet transmitted through a master node, the second data packet refers to a data packet transmitted through a secondary node, the first logical channels belong to the master node, the second logical channels belong to the secondary node, and the third logical channels belong to the master node.

2. The method according to claim 1, wherein the indication information is used to indicate at least one logical channel used by the at least one radio bearer which is selected from logical channels configured by the at least one radio bearer.

3. The method according to claim 2, wherein based on that the at least one radio bearer comprises a plurality of radio bearers, the PDCP duplication function activation signaling comprises a plurality of data offload indication identifiers and a plurality of pieces of indication information, wherein the plurality of data offload indication identifiers and the plurality of pieces of indication information correspond to the plurality of radio bearers respectively, and are arranged in an ascending or descending order of radio bearer identifiers of the plurality of radio bearers.

4. The method according to claim 2, wherein before receiving the PDCP duplication function activation signaling from the network, the method further comprises:
receiving first activation configuration information from the network, wherein the first activation configuration information comprises: a PDCP duplication field for indicating to configure the PDCP duplication function, a logical channel configured by each PDCP entity, and a carrier used by each logical channel.

5. The method according to claim 4, wherein the PDCP duplication function is a PDCP duplication function combined with Dual Connectivity (DC) and Carrier Aggregation (CA), and in the indication information, indication identifiers of logical channels are recorded in two groups, wherein the indication identifiers of the logical channels in each group are arranged in an ascending or descending order of Logical Channel IDentifier (LCID), one group of logical channels belongs to a master node, and the other group of logical channels belongs to a secondary node.

6. The method according to claim 2, wherein before receiving the PDCP duplication function activation signaling from the network, the method further comprises:
receiving second activation configuration information from the network, wherein the second activation configuration information comprises: a PDCP duplication field for indicating to configure the PDCP duplication function, a logical channel configured by each PDCP entity, priorities of logical channels, and a carrier used by each logical channel.

7. The method according to claim 6, wherein the indication information comprises a number of logical channels used by the at least one radio bearer, and the method further comprises:
determining the logical channels used by the at least one radio bearer based on the number of the logical channels and the priorities of the logical channels.

8. The method according to claim 1, wherein after determining the number of first logical channels used by the at least one radio bearer and the number of second logical channels used by the at least one radio bearer based on the indication information, to obtain the duplication number of the first data packet and the duplication number of the second data packet, the method further comprises:
duplicating the first data packet and the second data packet based on the duplication number of the first data packet and the duplication number of the second data packet, transmitting data packets obtained by duplicating the first data packet to the first logical channels, and transmitting data packets obtained by duplicating the second data packet to the second logical channels.

9. The method according to claim 1, wherein after determining the number of third logical channels used by the at least one radio bearer based on the indication information, to obtain the duplication number of the data packet, the method further comprises:
duplicating the data packet based on the duplication number of the data packet, and transmitting data packets obtained by duplicating the data packet to the third logical channels.

10. The method according to claim 7, wherein determining a duplication number of a data packet of the at least one radio bearer based on the PDCP duplication function activation signaling comprises:
based on that the at least one data offload indication identifier indicates that the at least one radio bearer does not perform data offload, determining the number of logical channels used by the at least one radio bearer based on the indication information to obtain the duplication number of the data packet.

11. The method according to claim 10, wherein after determining the number of logical channels used by the at least one radio bearer based on the indication information to obtain the duplication number of the data packet, the method further comprises:
duplicating the data packet based on the duplication number of the data packet, and transmitting data packets obtained by duplicating the data packet to the logical channels.

12. A Packet Data Convergence Protocol (PDCP) duplication function activation method, comprising:
determining a PDCP duplication function activation signaling, wherein the PDCP duplication function activation signaling comprises at least one data offload indication identifier of at least one radio bearer configured with a PDCP duplication function; and
transmitting the PDCP duplication function activation signaling to a User Equipment (UE), so that the UE determines a duplication number of a data packet of the at least one radio bearer based on the PDCP duplication function activation signaling;
wherein the PDCP duplication function activation signaling further comprises indication information,
wherein said the UE determining a duplication number of a data packet of the at least one radio bearer based on the PDCP duplication function activation signaling comprises:
based on that the at least one data offload indication identifier indicates that the at least one radio bearer is allowed to perform data offload, determining whether a data amount of the data packet is greater than or equal to a preset offload threshold;
in response to the data amount of the data packet being greater than or equal to the preset offload threshold, dividing the data packet into a first data packet and a second data packet, and determining a number of first logical channels used by the at least one radio bearer and a number of second logical channels used by the at least one radio bearer based on the indication information, to obtain a duplication number of the first data packet and a duplication number of the second data packet; and in response to the data amount of the data packet being less than the preset offload threshold, determining a number of third logical channels used by the at least one radio bearer based on the indication information, to obtain the duplication number of the data packet, wherein the first data packet refers to a data packet transmitted through a master node, the second data packet refers to a data packet transmitted through a secondary node, the first logical channels belong to the master node, the second logical channels belong to the secondary node, and the third logical channels belong to the master node.

13. The method according to claim 12, wherein the PDCP duplication function activation signaling further comprises indication information, wherein the indication information is used to indicate at least one logical channel used by the at least one radio bearer which is selected from logical channels configured by the at least one radio bearer.

14. The method according to claim 13, wherein based on that the at least one radio bearer comprises a plurality of radio bearers, the PDCP duplication function activation signaling comprises a plurality of data offload indication identifiers and a plurality of pieces of indication information, wherein the plurality of data offload indication identifiers and the plurality of pieces of indication information correspond to the plurality of radio bearers respectively, and are arranged in an ascending or descending order of radio bearer identifiers of the plurality of radio bearers.

15. The method according to claim 13, wherein before determining the PDCP duplication function activation signaling, the method further comprises:

transmitting first activation configuration information to the UE, wherein the first activation configuration information comprises: a PDCP duplication field for indicating to configure the PDCP duplication function, a logical channel configured by each PDCP entity, and a carrier used by each logical channel.

16. The method according to claim 13, wherein before determining the PDCP duplication function activation signaling, the method further comprises:

transmitting second activation configuration information to the UE, wherein the second activation configuration information comprises: a PDCP duplication field for indicating to configure the PDCP duplication function, a logical channel configured by each PDCP entity, priorities of logical channels, and a carrier used by each logical channel.

17. A storage medium having computer instructions stored therein, wherein when the computer instructions are executed, the method of claim 1 is performed.

18. A terminal comprising a memory and a processor, wherein the memory has computer instructions stored therein, and when the processor executes the computer instructions, the method of claim 1 is performed.

19. A base station comprising a memory and a processor, wherein the memory has computer instructions stored therein, and when the processor executes the computer instructions, the method of claim 12 is performed.

* * * * *